(12) United States Patent
Fix et al.

(10) Patent No.: US 9,321,503 B2
(45) Date of Patent: Apr. 26, 2016

(54) TRAILER TOWING SYSTEM (71) Applicant: Wisconsin Alumni Research Foundation, Madison, WI (US)

(72) Inventors: Michael Ray Fix, Rochester, MN (US); Katrina Lauren Ruedinger, Rochester, MN (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 14/271,860

(22) Filed: May 7, 2014

(65) Prior Publication Data

US 2015/0321727 A1 Nov. 12, 2015

(51) Int. Cl.
*B62K 27/12* (2006.01)
*B62K 27/00* (2006.01)

(52) U.S. Cl.
CPC .............. *B62K 27/12* (2013.01); *B62K 27/003* (2013.01)

(58) Field of Classification Search
CPC .............................. B62K 27/00; B62K 27/003
USPC .............................. 280/204, 405.1, 406.1, 656
See application file for complete search history.

(56) References Cited

U.S. PATENT DOCUMENTS

| | | | |
|---|---|---|---|
| 2,394,277 A * | 2/1946 | Viner | 280/204 |
| 3,345,104 A * | 10/1967 | Ulicki | B60P 3/04 119/412 |
| 4,614,352 A | 9/1986 | Cervantes | |
| 4,792,274 A * | 12/1988 | Cockram | B60P 1/433 14/71.1 |
| 5,785,333 A | 7/1998 | Hinkston et al. | |
| 5,785,334 A | 7/1998 | Robinson | |
| 5,979,921 A | 11/1999 | Derven et al. | |
| 5,984,332 A | 11/1999 | Beaudoin et al. | |
| 6,050,581 A * | 4/2000 | Everett | B62K 27/12 280/204 |
| 6,305,703 B1 | 10/2001 | Quick et al. | |
| 7,131,657 B1 | 11/2006 | Witt | |
| 7,549,661 B2 | 6/2009 | Jackson et al. | |
| 8,091,908 B2 | 1/2012 | Wilson et al. | |
| 8,636,094 B1 | 1/2014 | Conner et al. | |
| 2005/0173887 A1* | 8/2005 | Chen | B62K 27/12 280/204 |
| 2006/0207831 A1 | 9/2006 | Moore et al. | |
| 2008/0073871 A1 | 3/2008 | Winkel | |
| 2009/0051143 A1 | 2/2009 | Darling, III | |
| 2013/0264367 A1 | 10/2013 | Hill | |

FOREIGN PATENT DOCUMENTS

DE 10340507 A1 * 3/2005 ................. B62J 7/04

* cited by examiner

*Primary Examiner* — Joseph Rocca
*Assistant Examiner* — Felicia L Brittman
(74) *Attorney, Agent, or Firm* — Bell & Manning, LLC (57) ABSTRACT

A trailer mounting system includes a left arm, a right arm, a left side mounting device, a right side mounting device, and a trailer mounting device. The left side mounting device mounts to the left arm and to a left seat stay that mounts between a left side of a axle of a back wheel of a vehicle and a seat tube of the vehicle. The right side mounting device mounts to the right arm and to a right seat stay that mounts between a right side of the axle and the seat tube. The trailer mounting device mounts between the left arm and the right arm and is configured to mount to a trailer. The left side mounting device, the right side mounting device, and the trailer mounting device are mounted to rotate parallel to a direction of rotation of the axle of the back wheel of the vehicle.

20 Claims, 9 Drawing Sheets

Fig. 8

TRAILER TOWING SYSTEM

BACKGROUND

Bicycle trailers are used by bicyclists to transport children, pets, or other cargo. The bicycle trailers are attached to and pulled behind the bike.

SUMMARY

In an example embodiment, a trailer mounting system is provided. The trailer mounting system may include, but is not limited to, a left arm, a right arm, a left side mounting device, a right side mounting device, and a trailer mounting device. The left side mounting device is mounted to the left arm adjacent a first end of the left arm and is configured to mount to a left seat stay of a vehicle. The left seat stay mounts between a left side of an axle of a back wheel of the vehicle and a seat tube of the vehicle. A seat of the vehicle mounts to the seat tube. The right side mounting device is mounted to the right arm adjacent a first end of the right arm and is configured to mount to a right seat stay of the vehicle. The right seat stay mounts between a right side of the axle of the back wheel of the vehicle and the seat tube of the vehicle. The trailer mounting device is mounted between a second end of the left arm and a second end of the right arm. The first end of the left arm is opposite the second end of the left arm, and the first end of the right arm is opposite the second end of the right arm. The trailer mounting device is configured to mount to a trailer. The left side mounting device, the right side mounting device, and the trailer mounting device are mounted to rotate parallel to a direction of rotation of the axle of the back wheel of the vehicle.

In another example embodiment, a trailer system is provided. The trailer system may include, but is not limited to, a trailer and the trailer mounting system. The trailer may include, but is not limited to, a trailer bed, a left tire mounted below the trailer bed, a right tire mounted below the trailer bed, and the tow bar mounted to extend from the top of the trailer bed.

In another example embodiment, a towing system is provided. The towing system may include, but is not limited to, a vehicle, the trailer, and the trailer mounting system. The vehicle may include, but is not limited to, a back wheel and a frame. The back wheel may include, but is not limited to, the axle. The frame may include, but is not limited to, the seat tube, the left seat stay, and the right seat stay.

Other principal features and advantages will become apparent to those skilled in the art upon review of the following drawings, the detailed description, and the appended claims.

BRIEF DESCRIPTION OF THE DRAWINGS

Illustrative embodiments of the disclosed subject matter will hereafter be described with reference to the accompanying drawings, wherein like numerals denote like elements.

DETAILED DESCRIPTION

Figure 1:
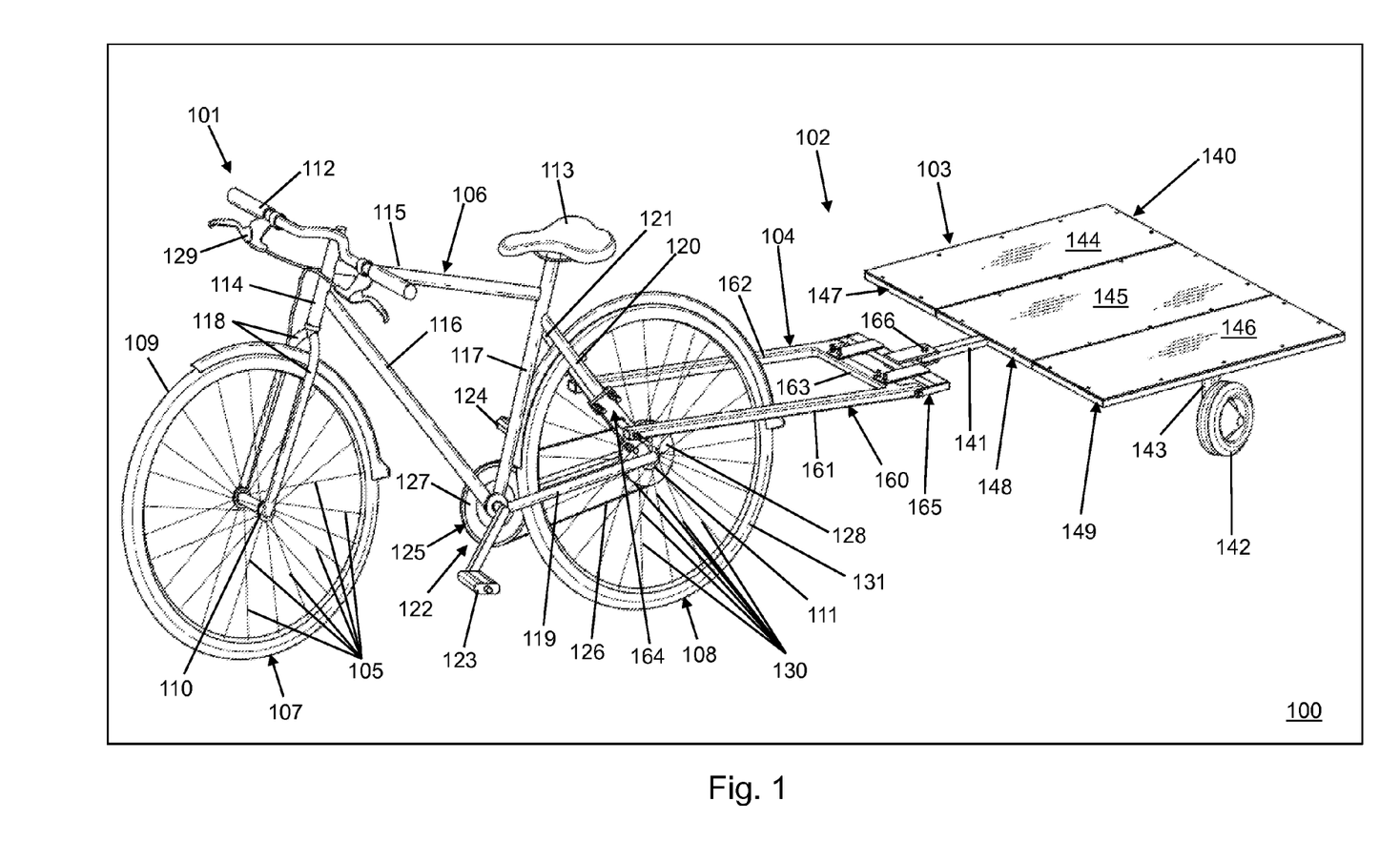
FIG. 1 depicts a left side perspective view of a towing system in accordance with an illustrative embodiment.

With reference to FIG. 1, a towing system 100 is shown in accordance with an illustrative embodiment. Towing system 100 may include a vehicle 101 and a trailer system 102. Trailer system 102 may include a trailer 103 and a trailer mounting system 104. Trailer mounting system 104 mounts between vehicle 101 and trailer 103. Trailer 103 is configured to support objects for transport using vehicle 101.

Towing system 100 may include a greater or a fewer number of components than those illustrated. The one or more components of towing system 100 may be formed of one or more materials, such as various metals, glass, elastomeric material, wood, and/or plastics having a sufficient strength and rigidity to support a specific application. For example, trailer 103 and/or trailer mounting system 104 may be performed of different materials dependent on a size and weight of objects to be transported, a type of vehicle used for the transport of the objects, etc.

In the illustrative embodiment, vehicle 101 is a bicycle though towing system 100 may include other types of vehicles as well as other types of bicycles. As other examples, vehicle 101 may include a motorcycle, a unicycle, etc. As other examples, the bicycle may include a three-wheel bicycle, a four-wheel bicycle, a tandem bicycle, a recumbent bicycle, etc.

As used herein, the term "mount" includes join, unite, connect, couple, associate, insert, hang, hold, affix, attach, fasten, bind, paste, secure, hinge, bolt, screw, rivet, solder, weld, glue, form over, form in, layer, mold, rest on, rest against, abut, and other like terms. The phrases "mounted on", "mounted to", and equivalent phrases indicate any interior or exterior portion of the element referenced. These phrases also encompass direct mounting (in which the referenced elements are in direct contact) and indirect mounting (in which the referenced elements are not in direct contact, but are connected through an intermediate element). Elements referenced as mounted to each other herein may further be integrally formed together, for example, using a molding or thermoforming process as understood by a person of skill in the art. As a result, elements described herein as being mounted to each other need not be discrete structural elements. The elements may be mounted permanently, removably, or releasably unless specified otherwise.

Use of directional terms, such as top, bottom, right, left, front, back, upper, lower, horizontal, vertical, behind, etc. are merely intended to facilitate reference to the various surfaces of the described structures relative to the orientations shown in the drawings and are not intended to be limiting in any manner unless otherwise indicated.

In the illustrative embodiment, vehicle 101 may include a bicycle frame 106, a front wheel 107, a back wheel 108, a handlebar 112, a seat 113, a drivetrain 122, and brakes 129. Front wheel 107 may include a front wheel axle 110, a plurality of spokes 105, and a front tire 109. The plurality of spokes 105 mount between front tire 109 and front wheel axle 110. Back wheel 108 may include a back wheel axle 111, a second plurality of spokes 130, and a back tire 131. The second plurality of spokes 130 may mount between back tire 131 and back wheel axle 111.

Handlebar 112 is configured to support steering of vehicle 101. Seat 113 is configured to support a vehicle operator in a seated or standing position. Brakes 129 mount to front wheel 107 and/or back wheel 108 and provide braking of vehicle 101 as understood by a person of skill in the art. Of course other types of handlebars may be used including racing handlebars, a steering wheel, etc. In some embodiments, seat 113 may not be mounted to seat tube 117.

Bicycle frame 106 may include a head tube 114, a connecting tube, a seat tube 117, a front fork 118, a left chain stay 119, a right chain stay (not shown), a left seat stay 120, and a right seat stay 121. For illustration, the connecting tube may include a top tube 115 and/or a down tube 116 that mount head tube 114 to seat tube 117. Top tube 115 may mount head tube 114 adjacent a top of seat tube 115 below seat 113. Down tube 116 may mount head tube 114 adjacent a bottom of seat tube 115. Seat 113 is mounted to an end of seat tube 117.

Head tube 114 mounts between front fork 118 and handlebar 112. Head tube 114 may include bearings that allow front fork 118 to turn smoothly for steering and balance. Front wheel axle 110 mounts between legs of front fork 118 and provides rotation of front wheel 107 about an axis of rotation defined by front wheel axle 110.

Left seat stay 120 mounts between a left connector (not shown) for back wheel axle 111 and seat tube 117. Right seat stay 121 mounts between a right connector (not shown) for of back wheel axle 111 and seat tube 117. Back wheel axle 111 mounts between the left connector adjacent left seat stay 120 and the right connector adjacent right seat stay 121 and provides rotation of back wheel 108 about a second axis of rotation defined by back wheel axle 111. The axis of rotation defined by front wheel axle 110 and the second axis of rotation defined by back wheel axle 111 are parallel to each other and perpendicular to a direction of orientation of front wheel axle 110 and back wheel 108 that define a direction of travel of vehicle 101.

Left chain stay 119 mounts between seat tube 115 and left seat stay 120 and/or the left connector of back wheel axle 111. The right chain stay mounts between seat tube 115 and right seat stay 121 and/or the right connector of back wheel axle 111.

Drivetrain 122 may be motorized and/or manually operated. In the illustrative embodiment, drivetrain 122 is manually driven and may include a left pedal 123, a right pedal 124, a gearing system 125, a chain 126, a front sprocket 127, and a back sprocket 128. In the illustrative embodiment, drivetrain 122 generates rotation of back wheel 108 though drivetrain 122 could be configured to generate rotation of front wheel 107. Left pedal 123 mounts to the bottom of seat tube 115 and to left chain stay 119 from the confluence of seat tube 115 and left chain stay 119. Right pedal 124 mounts to the bottom of seat tube 115 and to the right chain stay from the confluence of seat tube 115 and the right chain stay. Vehicle 101 may or may not include gearing system 125 as understood by a person of skill in the art. For example, vehicle 101 may include a bicycle with a single gear. Chain 126 is mounted to extend around a portion of front sprocket 127 and of back sprocket 128. Gearing system 125 controls movement of chain 126 on front sprocket 127 and/or back sprocket 128. Left chain stay 119 and the right chain stay extend parallel to chain 126.

Figure 2:
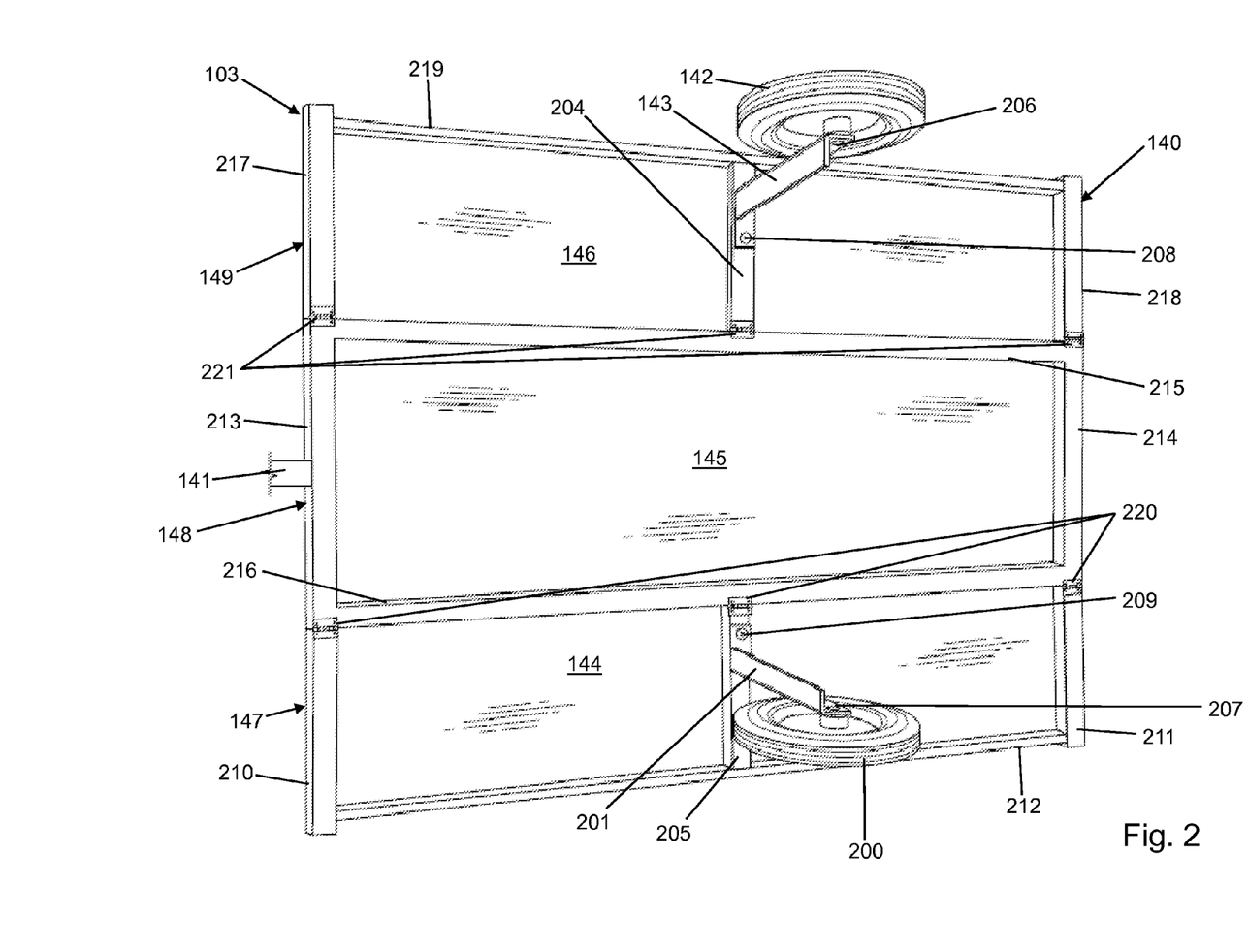
FIG. 2 depicts a bottom view of a trailer of the towing system of FIG. 1 in accordance with an illustrative embodiment.

Trailer 103 may include a trailer bed 140, a tow bar 141, a left tire 142, and a right tire 200 (shown with reference to FIG. 2), a first plurality of hinges 220 (shown with reference to FIG. 2), and a second plurality of hinges 221 (shown with reference to FIG. 2). Trailer bed 140 may include a plurality of shelves mounted horizontally. Adjacent shelves of the plurality of shelves may be mounted together along a longitudinal edge between the adjacent shelves using a hinge configured to provide downward rotation of an outside shelf relative to an adjacent shelf of the adjacent shelves. Though not shown, trailer 103 may include one or more side rails that surround some or all of trailer bed 140.

For illustration, trailer bed 140 may include a first shelf 144, a second shelf 145, and a third shelf 146. When in use, first shelf 144, second shelf 145, and third shelf 146 are mounted horizontally. First shelf 144 is generally flat and mounts to a first shelf platform 147. Second shelf 145 is generally flat and mounts to a second shelf platform 148. Third shelf 146 is generally flat and mounts to third shelf platform 149. Second shelf 145 mounts between first shelf 144 and third shelf 146.

Referring to FIG. 2, a bottom view of trailer 103 is shown in accordance with an illustrative embodiment. First shelf platform 147 may include a first shelf top frame 210, a first shelf bottom frame 211, and a first shelf right frame 212. First shelf right frame 212 mounts between first shelf top frame 210 and first shelf bottom frame 211 to form three sides of a rectangle. Second shelf platform 148 may include a second shelf top frame 213, a second shelf bottom frame 214, a second shelf left frame 215, and a second shelf right frame 216. Second shelf left frame 215 mounts between second shelf top frame 213 and second shelf bottom frame 214, and second shelf right frame 216 mounts between second shelf top frame 213 and second shelf bottom frame 214 to form a rectangle. Third shelf platform 149 may include a third shelf top frame 217, a third shelf bottom frame 218, and a third shelf left frame 219. Third shelf left frame 219 mounts between third shelf top frame 217 and third shelf bottom frame 218 to form three sides of a rectangle.

First shelf platform 147 mounts to second shelf right frame 216 of second shelf platform 148 using the first plurality of hinges 220. Second shelf right frame 216 forms a longitudinal edge between first shelf 144 and second shelf 145. The first plurality of hinges 220 are configured and mounted to provide downward rotation of first shelf 144 relative to second shelf 145. First shelf 144 is an outside shelf relative to second shelf 145, which is an adjacent shelf.

In the illustrative embodiment, the first plurality of hinges 220 includes three hinges. A first hinge of the first plurality of hinges 220 mounts between first shelf top frame 210 and second shelf top frame 213. A second hinge of the first plurality of hinges 220 mounts between first shelf bottom frame 211 and second shelf bottom frame 214. A third hinge of the first plurality of hinges 220 mounts between second shelf right frame 216 and a right tire brace 205 mounted between first shelf right frame 212 and second shelf right frame 216. The first plurality of hinges 220 provides downward rotation of first shelf 144 relative to second shelf 145. A greater or a fewer number of the first plurality of hinges 220 may be included.

Third shelf platform 149 mounts to second shelf left frame 215 of second shelf platform 148 using the second plurality of hinges 221. Second shelf left frame 215 forms a longitudinal edge between third shelf 146 and second shelf 145. The second plurality of hinges 221 are configured and mounted to provide downward rotation of third shelf 146 relative to second shelf 145. Third shelf 146 is an outside shelf relative to second shelf 145, which is an adjacent shelf.

In the illustrative embodiment, the second plurality of hinges 221 includes three hinges. A first hinge of the second plurality of hinges 221 mounts between third shelf top frame 217 and second shelf top frame 213. A second hinge of the second plurality of hinges 221 mounts between third shelf bottom frame 218 and second shelf bottom frame 214. A third hinge of the second plurality of hinges 221 mounts between second shelf left frame 215 and a left tire brace 204 mounted between third shelf left frame 219 and second shelf left frame 215. The second plurality of hinges 221 provides downward rotation of third shelf 146 relative to second shelf 145. A greater or a fewer number of the second plurality of hinges 221 may be included.

In the illustrative embodiment, trailer bed 140 has a rectangular shape when viewed from above. Trailer bed 140 may have alternative shapes such as circular or elliptical or form other polygonal shapes. Additionally, in the illustrative embodiment, other components of trailer 103 are generally rectangular and have square cross sections. The other components of trailer 103, such as first shelf top frame 210, first shelf bottom frame 211, first shelf right frame 212, second shelf top frame 213, second shelf bottom frame 214, second shelf left frame 215, second shelf right frame 216, third shelf top frame 217, third shelf bottom frame 218, and third shelf left frame 219, may have alternative shapes and cross sections such as circular or elliptical or form other polygonal shapes in alternative embodiments.

Tow bar 141 mounts to a top of trailer bed 140. For example, tow bar 141 mounts to and extends from second shelf top frame 213.

Left tire 142 mounts to a left strut 143. For illustration, a left tire fastener 206 rotatably mounts left tire 142 to left strut 143. Left strut 143 mounts to left tire brace 204. For illustration, a left strut fastener 208 mounts left strut 143 to left tire brace 204 that is mounted to trailer bed 140.

Right tire 200 mounts to a right strut 201. For illustration, a right tire fastener 207 rotatably mounts right tire 200 to right strut 201. Right strut 201 mounts to right tire brace 205. For illustration, a right strut fastener 209 mounts right strut 201 to right tire brace 205 that is mounted to trailer bed 140.

Referring again to FIG. 1, trailer mounting system 104 may include a frame 160, a left side mounting device 164, a right side mounting device 300 (shown with reference to FIGS. 3a and 3b), and a trailer mounting device 165. Frame 160 may include a left arm 161, a right arm 162, and an arm brace 163. Arm brace 163 is mounted between left arm 161 and right arm 162. Though shown linear, left arm 161, right arm 162, and/or arm brace 163 may be bowed, bent, serpentine, etc.

Left side mounting device 164 mounts to left arm 161 adjacent a first end of left arm 161. Left side mounting device 164 also mounts to left seat stay 120. Right side mounting device 300 mounts to right arm 162 adjacent a first end of right arm 162. Right side mounting device 300 also mounts to right seat stay 121. Trailer mounting device 165 mounts between a second end of left arm 161 and a second end of right arm 162. The first end of left arm 161 is opposite the second end of left arm 161. The first end of right arm 162 is opposite the second end of right arm 162. Trailer mounting device 165 mounts to trailer 103. Left side mounting device 164, right side mounting device 300, and trailer mounting device 165 are mounted to rotate parallel to the second axis of rotation defined by back wheel axle 111 of back wheel 108.

In the illustrative embodiment, a mounting bolt 166 inserted in a mounting bolt aperture edge 301 (shown with reference to FIG. 3a) formed through mounting plates 339 (shown with reference to FIG. 3a) and in an aperture edge (not shown) formed through tow bar 141 mounts trailer mounting system 104 to trailer 103. Mounting bolt 166 inserted in mounting bolt aperture edge 301 and in the aperture edge supports a yawing motion between trailer mounting system 104 and trailer 103 to allow vehicle 101 to traverse corners more sharply. Of course, other methods of mounting trailer mounting system 104 to trailer 103 may be used. For example, a ball may be mounted to mounting plates 339 and a socket mounted to tow bar 141. As another example, a quick release mounting mechanism may be used to mount trailer mounting system 104 to trailer 103. In the illustrative embodiment, mounting plates 339 includes two parallel plates. A greater or a fewer number of mounting plates 339 may be included. A greater number of mounting bolts further may be included.

Figure 3A:
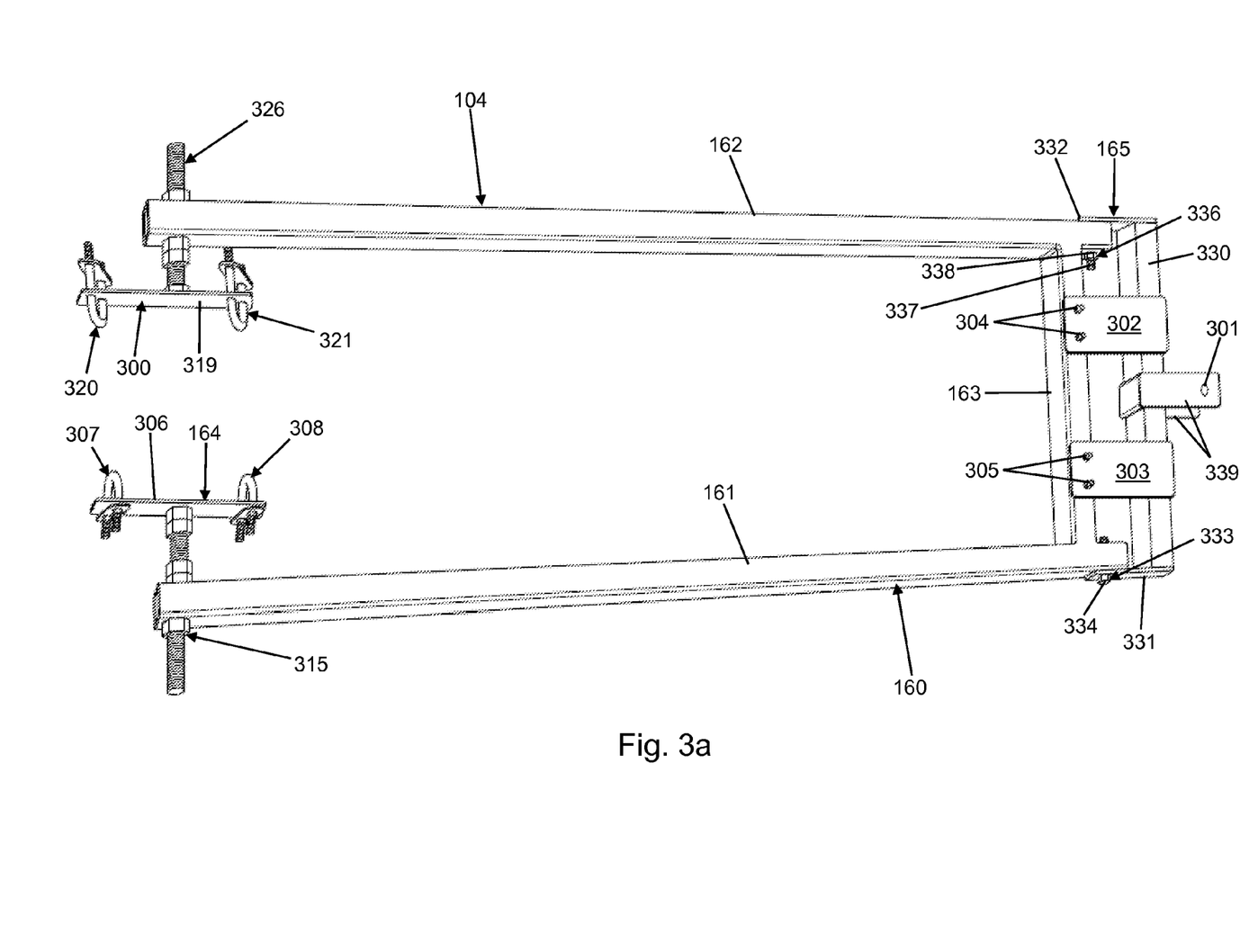
FIG. 3a depicts a top perspective view of a trailer mounting system of the towing system of FIG. 1 in accordance with an illustrative embodiment.
Figure 3B:
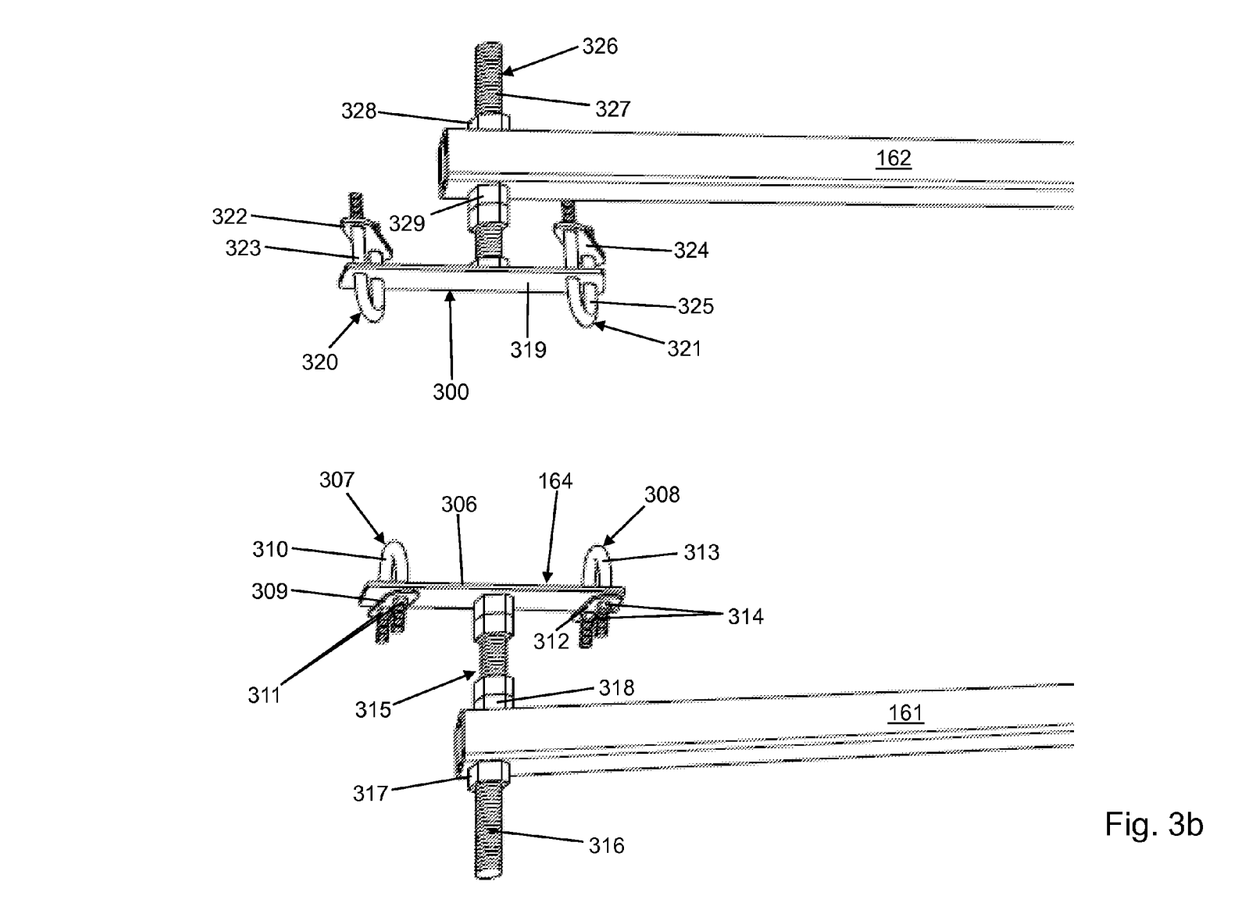
FIG. 3b depicts a top perspective view of the trailer mounting system of FIG. 3a zoomed to show left and right side mounting devices in accordance with an illustrative embodiment.

Referring to FIG. 3a, a top perspective view of trailer mounting system 104 is shown in accordance with an illustrative embodiment. Referring to FIG. 3b, a zoomed view of left side mounting device 164 and of right side mounting device 300 are shown in accordance with an illustrative embodiment.

In the illustrative embodiment, a first block 302 and a second block 303 mount to arm brace 163, for example, using first block fasteners 304 and second block fasteners 305, respectively. First block 302 and second block 303 form rectangular plates though first block 302 and second block 303 may have alternative shapes such as circular or elliptical or form other polygonal shapes in alternative embodiments. First block 302 and second block 303 extend over a top surface of a mounting brace 330 to prevent left arm 161 and right arm 162 from extending below mounting brace 330. A greater or a fewer number of blocks may be included. First block 302 and second block 303 may extend over a greater or a lesser length of mounting brace 330.

In the illustrative embodiment, trailer mounting device 165 further may include a left plate 331, a right plate 332, a left plate fastener 333, a left plate threaded bolt 334, a left plate nut 400 (shown with reference to FIG. 4), a right plate fastener 336, a right plate threaded bolt 337, and a right plate nut 338. Left plate 331 includes a left plate aperture edge (not shown). Right plate 332 includes a right plate aperture edge (not shown). Left plate 331 mounts between a left end of mounting brace 330 and the second end of left arm 161. Left plate 331 mounts to the second end of left arm 161 using left plate fastener 333. In the illustrative embodiment, left plate fastener 333 includes left plate threaded bolt 334 and left plate nut 400. Left plate threaded bolt 334 is inserted into a hole formed by the left plate aperture edge of left plate 331.

Right plate 332 mounts between a right end of mounting brace 330 and the second end of right arm 162. Right plate 332 mounts to the second end of right arm 162 using right plate fastener 336. In the illustrative embodiment, right plate fastener 336 includes right plate threaded bolt 337 and right plate nut 338. Right plate threaded bolt 337 is inserted into a hole formed by the right plate aperture edge of right plate 332.

Left plate threaded bolt 334 defines an axis of rotation of trailer mounting device 165 relative to left arm 161 that is parallel to the second axis of rotation defined by back wheel axle 111 of back wheel 108. Right plate threaded bolt 337 defines an axis of rotation of trailer mounting device 165 relative to right arm 162 that also is parallel to the second axis of rotation defined by back wheel axle 111 of back wheel 108. Other mounting mechanisms may be used to mount trailer mounting device 165 to left arm 161 and to right arm 162 to provide rotation parallel to the second axis of rotation defined by back wheel axle 111 of back wheel 108.

In the illustrative embodiment, mounting plates 339 mount to and extend from a center of mounting brace 330. As another example, mounting plates 339 may mount to and extend from a center of arm brace 163. As yet another example, a bolt may mount mounting plates 339 to a center of arm brace 163 or to the center of mounting brace 330 and define an axis of rotation of mounting plates 339 of trailer mounting device 165 relative to both left arm 161 and right arm 162. The axis of rotation of mounting plates 339 of trailer mounting device 165 relative to both left arm 161 and right arm 162 is parallel to the second axis of rotation defined by back wheel axle 111 of back wheel 108.

Referring to FIG. 3*b*, left side mounting device 164 may be implemented as a first clamp, and right side mounting device 300 may be implemented as a second clamp. The first clamp may include a first upper clamp 307, a first lower clamp 308, a first upper clamp plate 309, a first upper clamp threaded u-bolt 310, first upper clamp nuts 311, a first lower clamp plate 312, a first lower clamp threaded u-bolt 313, first lower clamp nuts 314, a first clamp fastener 315, a first clamp threaded bolt 316, and a first clamp nut 317. The second clamp may include a second clamp nut 318, a second clamp bar 319, a second upper clamp 320, a second lower clamp 321, a second upper clamp plate 322, a second upper clamp threaded u-bolt 323, second upper clamp nuts 500 (shown with reference to FIG. 5), a second lower clamp plate 324, a second lower clamp threaded u-bolt 325, second lower clamp nuts 501 (shown with reference to FIG. 5), a second clamp fastener 326, a second clamp threaded bolt 327, a third clamp nut 328, and a fourth clamp nut 329.

First upper clamp 307 and first lower clamp 308 mount at opposite ends of first clamp bar 306. First upper clamp 307 may include first upper clamp plate 309, first upper clamp threaded u-bolt 310, and first upper clamp nuts 311. First upper clamp apertures (not shown) are formed through first clamp bar 306 to allow insertion of opposed ends of first upper clamp threaded u-bolt 310 therethrough. A top of first upper clamp threaded u-bolt 310 and first clamp bar 306 form a channel within which left seat stay 120 is positioned. First upper clamp plate 309 also includes upper clamp apertures (not shown) through which first upper clamp threaded u-bolt 310 is inserted. First upper clamp nuts 311 are mounted on opposed ends of first upper clamp threaded u-bolt 310 and tightened to position a first end of first clamp bar 306 tightly against left seat stay 120.

First lower clamp 308 may include first lower clamp plate 312, first lower clamp threaded u-bolt 313, and first lower clamp nuts 314. First lower clamp apertures (not shown) are formed through first clamp bar 306 to allow insertion of opposed ends of first lower clamp threaded u-bolt 313 therethrough. A top of first lower clamp threaded u-bolt 313 and first clamp bar 306 form a channel within which left seat stay 120 is positioned. First lower clamp plate 312 also includes lower clamp apertures (not shown) through which first lower clamp threaded u-bolt 313 is inserted. First lower clamp nuts 314 are mounted on opposed ends of first lower clamp threaded u-bolt 313 and tightened to position a second end of first clamp bar 306 tightly against left seat stay 120.

First clamp fastener 315 mounts the first clamp to left arm 161. In the illustrative embodiment, first clamp fastener 315 mounts first clamp bar 306 to left arm 161. First clamp fastener 315 may include first clamp threaded bolt 316, first clamp nut 317, and second clamp nut 318. At a first end, first clamp threaded bolt 316 mounts to first clamp bar 306. First clamp threaded bolt 316 extends from first clamp bar 306 on a side opposite the channel formed by first upper clamp threaded u-bolt 310 and first clamp bar 306 and opposite the channel formed by first lower clamp threaded u-bolt 313 and first clamp bar 306. A second end of first clamp threaded bolt 316 is inserted through apertures (not shown) on either side of left arm 161. First clamp threaded bolt 316 is also inserted through first clamp nut 317 and through second clamp nut 318 that are positioned against opposite sides of left arm 161. Rotating first clamp nut 317 and second clamp nut 318 allows adjustment of a spacing between left arm 161 and first clamp bar 306.

Second upper clamp 320 may include second upper clamp plate 322, second upper clamp threaded u-bolt 323, and second upper clamp nuts 500. Second upper clamp apertures (not shown) are formed through second clamp bar 319 to allow insertion of opposed ends of second upper clamp threaded u-bolt 323 therethrough. A top of second upper clamp threaded u-bolt 323 and second clamp bar 306 form a channel within which right seat stay 121 is positioned. Second upper clamp plate 322 also includes upper clamp apertures (not shown) through which second upper clamp threaded u-bolt 323 is inserted. Second upper clamp nuts 500 are mounted on opposed ends of second upper clamp threaded u-bolt 323 and tightened to position a first end of second clamp bar 319 tightly against right seat stay 121.

Second lower clamp 321 may include second lower clamp plate 324, second lower clamp threaded u-bolt 325, and second lower clamp nuts 501. Second lower clamp apertures (not shown) are formed through second clamp bar 319 to allow insertion of opposed ends of second lower clamp threaded u-bolt 325 therethrough. A top of second lower clamp threaded u-bolt 325 and second clamp bar 319 form a channel within which right seat stay 121 is positioned. Second lower clamp plate 324 also includes lower clamp apertures (not shown) through which second lower clamp threaded u-bolt 325 is inserted. Second lower clamp nuts 501 are mounted on opposed ends of second lower clamp threaded u-bolt 325 and tightened to position a second end of second clamp bar 319 tightly against right seat stay 121.

Second clamp fastener 326 mounts the second clamp to right arm 162. In the illustrative embodiment, second clamp fastener 326 mounts second clamp bar 319 to right arm 162. Second clamp fastener 326 may include second clamp threaded bolt 327, third clamp nut 328, and fourth clamp nut 329. At a first end, second clamp threaded bolt 327 mounts to second clamp bar 319. Second clamp threaded bolt 327 extends from second clamp bar 319 on a side opposite the channel formed by second upper clamp threaded u-bolt 323 and second clamp bar 319 and opposite the channel formed by second lower clamp threaded u-bolt 325 and second clamp bar 319. A second end of second clamp threaded bolt 327 is inserted through apertures (not shown) on either side of right arm 162. Second clamp threaded bolt 327 is also inserted through third clamp nut 328 and through fourth clamp nut 329 that are positioned against opposite sides of right arm 162. Rotating third clamp nut 328 and fourth clamp nut 329 allows adjustment of a spacing between right arm 162 and second clamp bar 319.

The first clamp and/or the second clamp may include a fewer or a greater number of clamps. Other mounting mechanisms may be used to mount left side mounting device 164 and right side mounting device 300 to left arm 161 and to right arm 162, respectively. Other mounting mechanisms further may be used to mount left side mounting device 164 and right side mounting device 300 to left seat stay 120 and to right seat stay 121.

Figure 4:
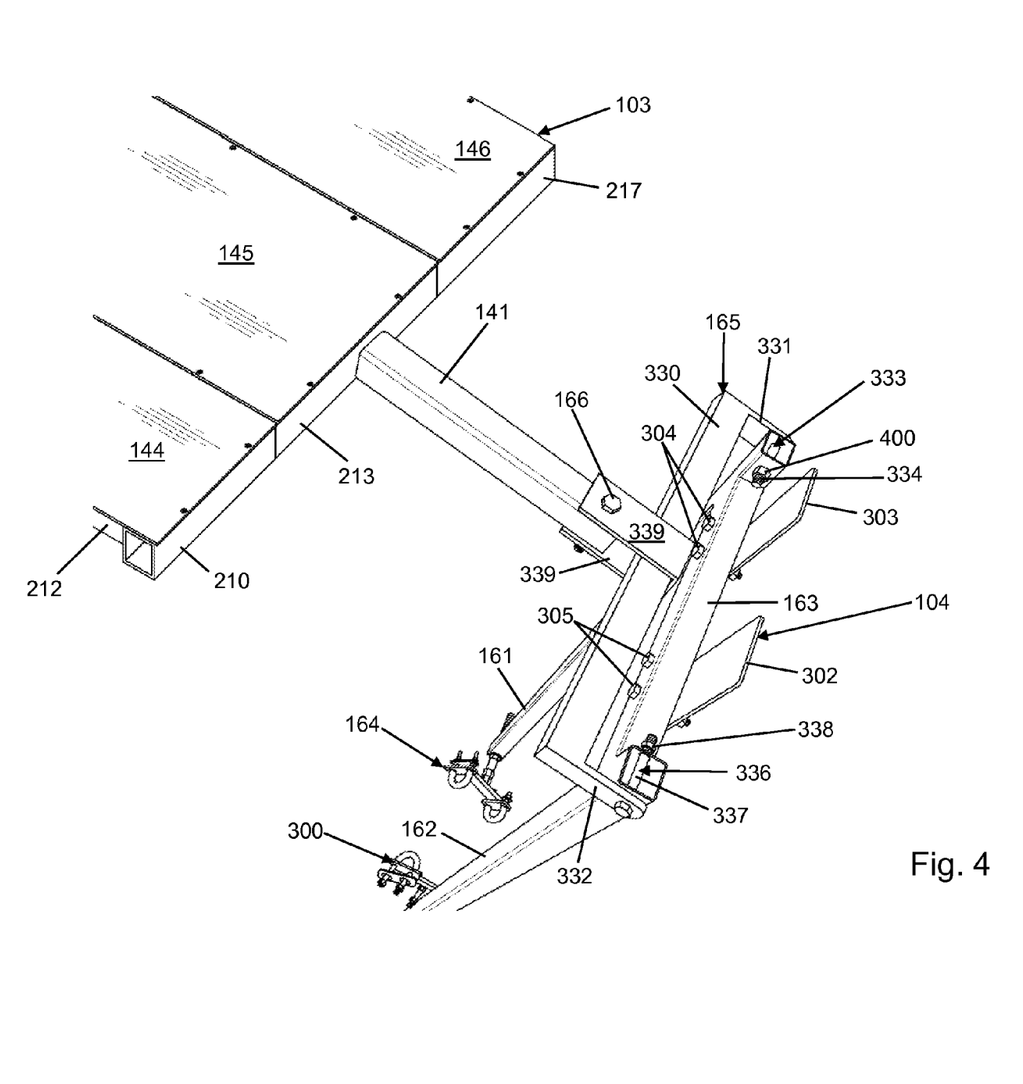
FIG. 4 depicts a top, right perspective view of a trailer system of the towing system of FIG. 1 in accordance with an illustrative embodiment.

Referring to FIG. 4, a top, right perspective view of trailer system 102 is shown in accordance with an illustrative embodiment. Mounting bolt 166 is inserted in mounting bolt aperture edge 301 formed through mounting plates 339 and in the aperture edge formed through tow bar 141 to mount trailer mounting system 104 to trailer 103. A top of trailer 103 is shown tilted upwards, for example, to rest a bottom of trailer 103 on the ground. Trailer mounting device 165 remains aligned with tow bar 141. A remainder of trailer mounting system 104 is tilted upwards as a result of rotation about the axes defined by left plate threaded bolt 334 and right plate threaded bolt 337.

Figure 5:
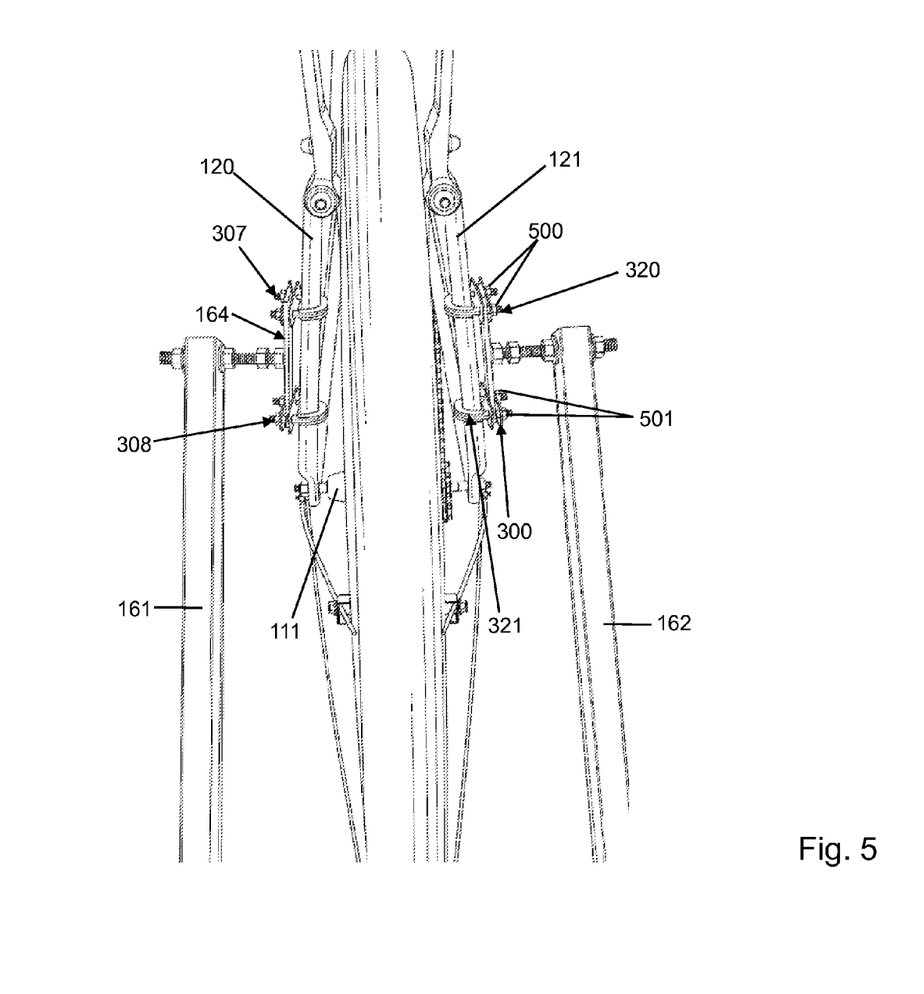
FIG. 5 depicts a back perspective view of the towing system of FIG. 1 zoomed to show the left and right side mounting devices mounted to a vehicle in accordance with an illustrative embodiment.

Referring to FIG. 5, a back perspective view of towing system 100 zoomed to show left side mounting device 164 and right side mounting device 300 is shown in accordance with an illustrative embodiment. First upper clamp 307 and first lower clamp 308 of left side mounting device 164 are mounted to left seat stay 120. Second upper clamp 320 and second lower clamp 321 of right side mounting device 300 are mounted to right seat stay 121.

Figure 6:
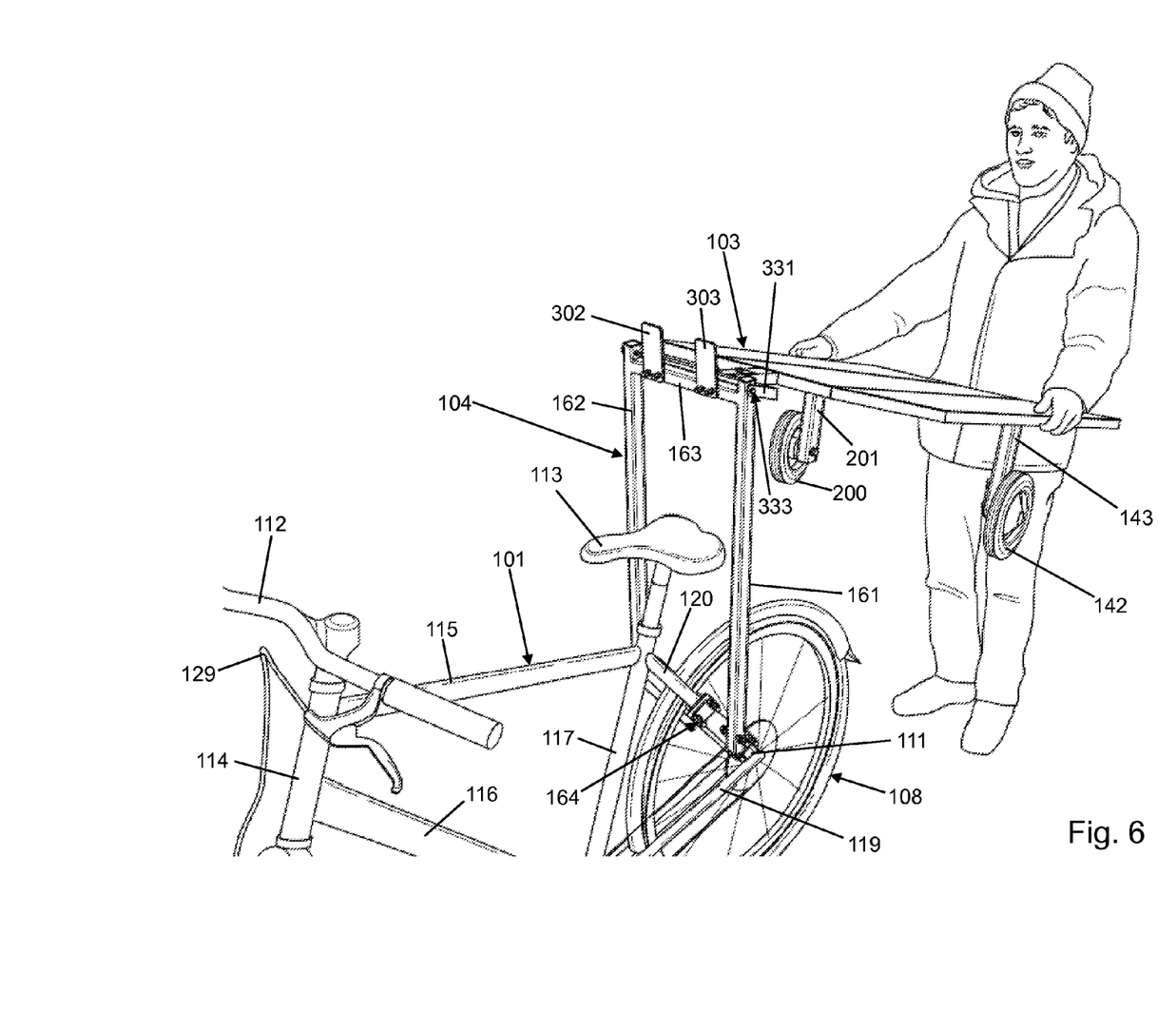
FIG. 6 depicts a front, left side perspective view of the towing system of FIG. 1 in accordance with an illustrative embodiment with the trailer in a process of being moved to a stowed position.

Referring to FIG. 6, a front, left side perspective view of towing system 100 is shown in accordance with an illustrative embodiment with trailer 103 in a process of being moved to a stowed position. Trailer mounting system 104 remains mounted to vehicle 101 and to trailer 103. Trailer 103 is lifted upwards and rotated towards vehicle 101. Trailer mounting system 104 rotates with trailer 103 as a result of rotation about the axes defined by left plate threaded bolt 334 and right plate threaded bolt 337 and about the axes defined by first clamp threaded bolt 316 and second clamp threaded bolt 327.

Figure 7:
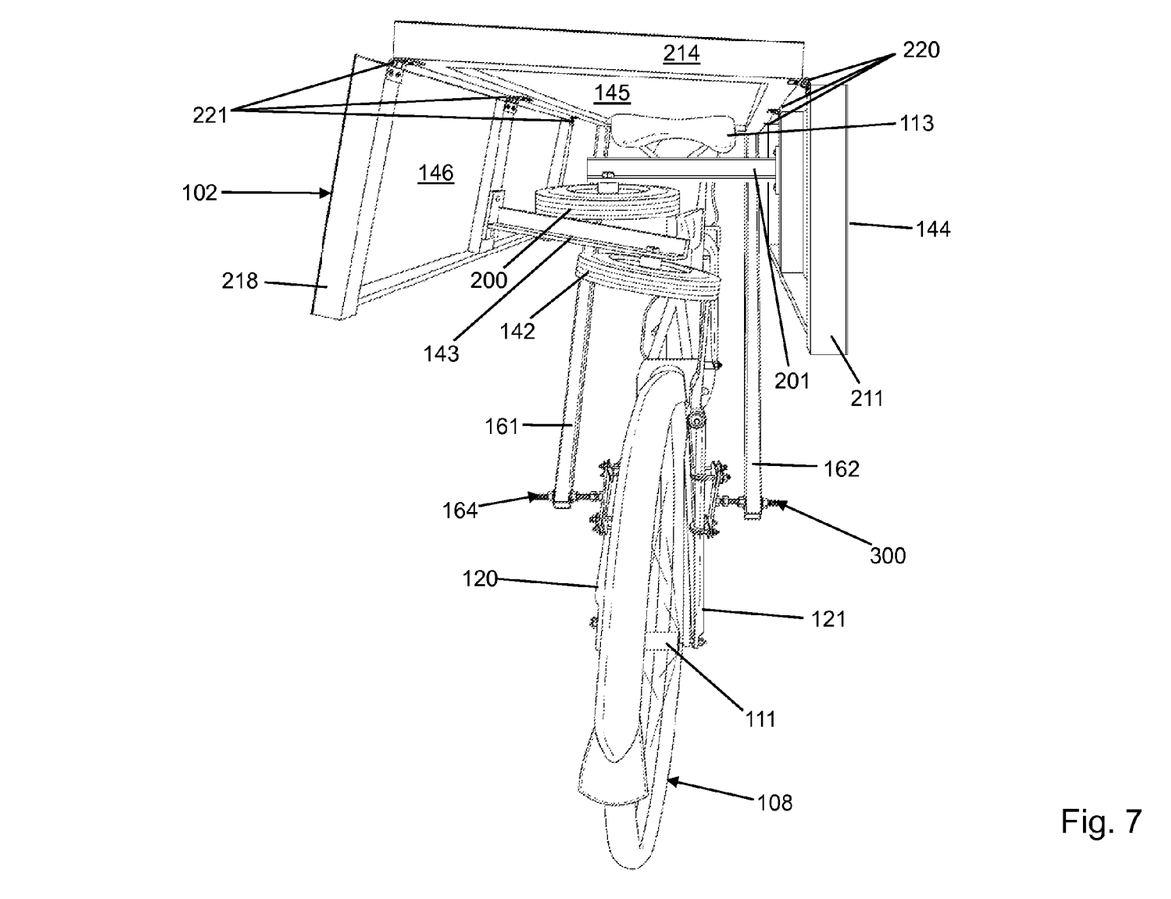
FIG. 7 depicts a back perspective view of the towing system of FIG. 1 in accordance with an illustrative embodiment with the trailer in the stowed position.
Figure 8:
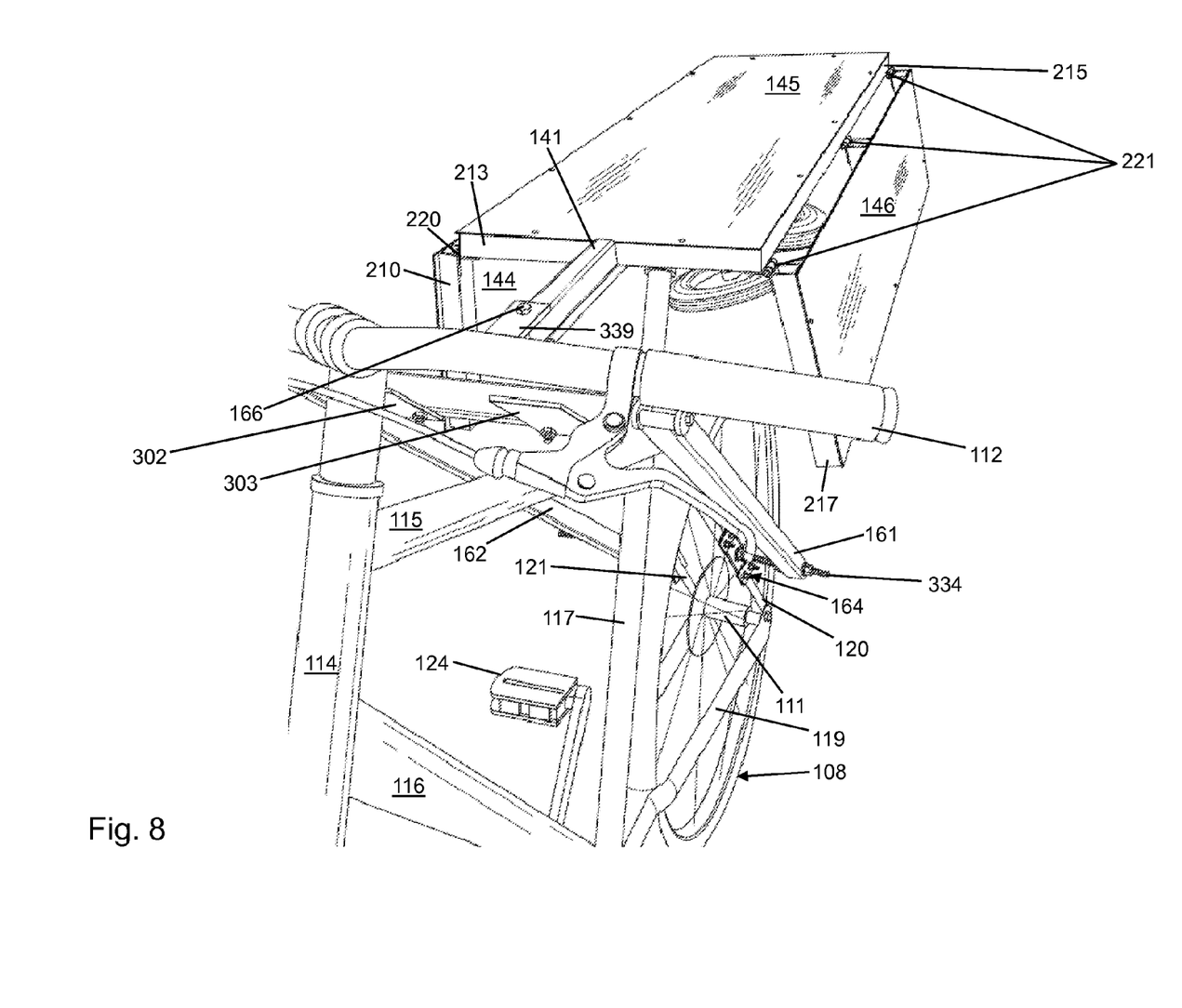
FIG. 8 depicts a front perspective view of the towing system of FIG. 1 in accordance with an illustrative embodiment with the trailer in the stowed position.

Referring to FIG. 7, a back perspective view of towing system 100 is shown in accordance with an illustrative embodiment with trailer 103 in the stowed position. Referring to FIG. 8, a front perspective view of towing system 100 is shown in accordance with an illustrative embodiment with trailer 103 in the stowed position. In the illustrative embodiment, second shelf 145 rests on seat 113 though second shelf 145 could also rest on handlebar 112. Additionally, a portion of second shelf platform 148 could rest on seat 113 or handlebar 112. Arm brace 163 and/or mounting brace 330 could rest on seat 113, handlebar 112, and/or top tube 115.

First shelf 144 and third shelf 146 rotate downward relative to second shelf 145 to reduce an amount of horizontal space used to stow trailer 103. Left tire 142 and right tire 200 are mounted at different distances from first shelf top frame 210 and third shelf top frame 217, respectively, to avoid a collision between left tire 142 and right tire 200 when first shelf 144 and third shelf 146 are rotated downward. In the stowed position, trailer mounting system 104 remains mounted to vehicle 101 and to trailer 103.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, in the detailed description, the use of "and" or "or" is intended to include "and/or" unless specifically indicated otherwise.

The foregoing description of illustrative embodiments has been presented for purposes of illustration and of description. It is not intended to be exhaustive or to limit the subject matter to the precise form disclosed. Modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A trailer mounting system comprising:
   a left arm;
   a right arm;
   a left side mounting device mounted to the left arm adjacent a first end of the left arm to provide rotation of the left arm relative to the left side mounting device, the left side mounting device configured to fasten directly and only to a left seat stay of a vehicle above an axle of a back wheel of the vehicle, wherein the left seat stay mounts between a left side of the axle of the back wheel of the vehicle and a seat tube of the vehicle, wherein a seat of the vehicle mounts to the seat tube;
   a right side mounting device mounted to the right arm adjacent a first end of the right arm to provide rotation of the right arm relative to the right side mounting device, the right side mounting device configured to fasten directly and only to a right seat stay of the vehicle above the axle of the back wheel of the vehicle, wherein the right seat stay mounts between a right side of the axle of the back wheel of the vehicle and the seat tube of the vehicle; and
   a trailer mounting device mounted between a second end of the left arm and a second end of the right arm to provide rotation of the left arm and the right arm relative to the trailer mounting device, wherein the first end of the left arm is opposite the second end of the left arm and the first end of the right arm is opposite the second end of the right arm, the trailer mounting device configured to mount to a trailer;
   wherein the left side mounting device, the right side mounting device, and the trailer mounting device are mounted to provide rotation of the left arm and the right arm parallel to a direction of rotation of the axle of the back wheel of the vehicle to extend the second end of the left arm and the second end of the right arm above the back wheel.

2. The trailer mounting system of claim 1, wherein the left side mounting device comprises a bolt, wherein the bolt mounts to the left arm to provide the rotation of the left side mounting device relative to the left arm.

3. The trailer mounting system of claim 2, wherein the right side mounting device comprises a second bolt, wherein the second bolt mounts to the right arm to provide the rotation of the right side mounting device relative to the right arm.

4. The trailer mounting system of claim 2, wherein the bolt is threaded and the left side mounting device further comprises a first nut, wherein the first nut is mounted to the threaded bolt on a first side of the left arm.

5. The trailer mounting system of claim 4, wherein the left side mounting device further comprises a second nut, wherein the second nut is mounted to the threaded bolt on a second side of the left arm, wherein the second side is opposite the first side.

6. The trailer mounting system of claim 4, wherein the left side mounting device further comprises a first clamp mounted to a first end of the bolt opposite a second end of the bolt on which the first nut is mounted, wherein the first clamp is configured to mount the left side mounting device directly to the left seat stay.

7. The trailer mounting system of claim 6, wherein the first clamp comprises a bar mounted to the first end of the bolt, a first clamp nut, a second clamp nut, and a u-bolt, wherein the bar comprises a first aperture edge and a second aperture edge that define a first hole and a second hole, respectively, through the bar, wherein the u-bolt is mounted through the first hole and the second hole, wherein the first clamp nut and the second clamp nut mount the u-bolt to the bar.

8. The trailer mounting system of claim 7, wherein the first clamp further comprises a third clamp nut, a fourth clamp nut, and a second u-bolt, wherein the bar comprises a third aperture edge and a fourth aperture edge that define a third hole and a fourth hole, respectively, through the bar, wherein the second u-bolt is mounted through the third hole and the fourth hole, wherein the third clamp nut and the fourth clamp nut mount the second u-bolt to the bar.

9. The trailer mounting system of claim 2, wherein the trailer mounting device comprises a brace mounted between the left arm and the right arm.

10. The trailer mounting system of claim 9, wherein the trailer mounting device further comprises a second bolt and a mounting plate mounted to the brace, wherein the second bolt mounts the mounting plate to the left arm and provides the rotation of the trailer mounting device relative to the left arm and the right arm.

11. The trailer mounting system of claim 9, wherein the trailer mounting device further comprises a second bolt and a third bolt, wherein the second bolt mounts the brace to the left arm and provides the rotation of the trailer mounting device relative to the left arm, wherein the third bolt mounts the brace to the right arm and provides the rotation of the trailer mounting device relative to the right arm.

12. The trailer mounting system of claim 11, wherein the trailer mounting device further comprises a left plate comprising a first aperture edge through which the second bolt is mounted and a right plate comprising a second aperture edge through which the third bolt is mounted, wherein the left plate mounts between the left arm and the brace, and the right plate mounts between the right arm and the brace.

13. The trailer mounting system of claim 9, wherein the trailer mounting device further comprises a second brace mounted between the left arm and the right arm and a block mounted to the second brace to extend over a top surface of the brace.

14. A trailer system comprising:
a trailer comprising
  a trailer bed;
  a left tire mounted below the trailer bed;
  a right tire mounted below the trailer bed; and
  a tow bar mounted to extend from the trailer bed; and
a trailer mounting system comprising
  a left arm;
  a right arm;
  a left side mounting device mounted to the left arm adjacent a first end of the left arm to provide rotation of the left arm relative to the left side mounting device, the left side mounting device configured to fasten directly and only to a left seat stay of a vehicle above an axle of a back wheel of the vehicle, wherein the left seat stay mounts between a left side of the axle of the back wheel of the vehicle and a seat tube of the vehicle, wherein a seat of the vehicle mounts to the seat tube;
  a right side mounting device mounted to the right arm adjacent a first end of the right arm to provide rotation of the right arm relative to the right side mounting device, the right side mounting device configured to fasten directly and only to a right seat stay of the vehicle above the axle of the back wheel of the vehicle, wherein the right seat stay mounts between a right side of the axle of the back wheel of the vehicle and the seat tube of the vehicle; and
  a trailer mounting device mounted between a second end of the left arm and a second end of the right arm to provide rotation of the left arm and the right arm relative to the trailer mounting device, wherein the first end of the left arm is opposite the second end of the left arm and the first end of the right arm is opposite the second end of the right arm, the trailer mounting device configured to mount to the tow bar of the trailer;
  wherein the left side mounting device, the right side mounting device, and the trailer mounting device are mounted to provide rotation of the left arm and the right arm parallel to a direction of rotation of a tire axle of the left tire to extend the second end of the left arm and the second end of the right arm above the back wheel.

15. The trailer system of claim 14, wherein the trailer bed comprises a plurality of shelves mounted horizontally, wherein adjacent shelves of the plurality of shelves are mounted together along a longitudinal edge between the adjacent shelves using a hinge, wherein the hinge is configured to provide downward rotation of an outside shelf relative to an adjacent shelf of the adjacent shelves.

16. The trailer system of claim 14, wherein the trailer bed comprises a first shelf, a second shelf, and a third shelf mounted horizontally, wherein the second shelf is mounted between the first shelf and the third shelf, wherein the second shelf is mounted to the first shelf along a longitudinal edge between the first shelf and the second shelf using a first hinge, wherein the first hinge is configured to provide downward rotation of the first shelf relative to the second shelf.

17. The trailer system of claim 14, wherein the trailer mounting device comprises a first brace mounted between the left arm and the right arm and a second brace mounted between the left arm and the right arm and a block mounted to the second brace to extend over a top surface of the first brace.

18. A towing system comprising:
a vehicle comprising
  a back wheel comprising a back axle; and
  a frame comprising
    a seat tube, wherein the seat tube is configured to support a seat;
    a left seat stay mounted between a left side of the back axle and the seat tube; and
    a right seat stay mounted between a right side of the back axle and the seat tube;
a trailer comprising
  a trailer bed;
  a left tire mounted below the trailer bed;
  a right tire mounted below the trailer bed; and
  a tow bar mounted to extend from the trailer bed; and
a trailer mounting system comprising
  a left arm;
  a right arm;
  a left side mounting device mounted to the left arm adjacent a first end of the left arm to provide rotation of the left arm relative to the left side mounting device, the left side mounting device fastened directly and only to the left seat stay above the back axle;

a right side mounting device mounted to the right arm adjacent a first end of the right arm to provide rotation of the right arm relative to the right side mounting device, the right side mounting device fastened directly and only to the right seat stay above the back axle; and a trailer mounting device mounted between a second end of the left arm and a second end of the right arm to provide rotation of the left arm and the right arm relative to the trailer mounting device, wherein the first end of the left arm is opposite the second end of the left arm and the first end of the right arm is opposite the second end of the right arm, the trailer mounting device configured to mount to the tow bar of the trailer;

wherein the left side mounting device, the right side mounting device, and the trailer mounting device are mounted to provide rotation of the left arm and the right arm parallel to a direction of rotation of the back axle to extend the second end of the left arm and the second end of the right arm above the back wheel.

19. The towing system of claim 18, wherein the trailer bed comprises a plurality of shelves mounted horizontally, wherein adjacent shelves of the plurality of shelves are mounted together along a longitudinal edge between the adjacent shelves using a hinge, wherein the hinge is configured to provide downward rotation of an outside shelf relative to an adjacent shelf of the adjacent shelves, wherein a shelf of the plurality of shelves is configured to rest on a handlebar of the vehicle or on the seat of the vehicle when the trailer is moved to a stowed position relative to the vehicle.

20. The towing system of claim 18, wherein the trailer bed comprises a shelf that extends between a top edge, a bottom edge, a left edge, and a right edge, wherein the left tire is mounted a first distance from the top edge of the shelf of the trailer bed, and the right tire is mounted a second distance from the top edge of the shelf of the trailer bed, wherein the first distance is sufficiently different from the second distance to avoid a collision between the left tire and the right tire when the trailer is moved to a stowed position relative to the vehicle.

* * * * *